United States Patent [19]
Ihara et al.

[11] Patent Number: 6,025,675
[45] Date of Patent: Feb. 15, 2000

[54] CATHODE-RAY TUBE AND BLUE PHOSPHOR

[75] Inventors: Masaru Ihara; Hiroshi Kato, both of Kanagawa; Katsutoshi Ohno, Tokyo, all of Japan

[73] Assignee: Sony Corporation, Japan

[21] Appl. No.: 09/061,224

[22] Filed: Apr. 17, 1998

[30] Foreign Application Priority Data

Apr. 23, 1997 [JP] Japan .................................. P09-106150

[51] Int. Cl.$^7$ ...................................................... H01J 29/88
[52] U.S. Cl. .................. 313/467; 313/468; 252/301.4 S; 252/301.6 S; 252/301.6 R
[58] Field of Search ..................................... 313/467, 468, 313/461; 252/301.6 R, 301.6 S, 301.4 S

[56] References Cited

U.S. PATENT DOCUMENTS 4,728,856  3/1988  Iwasaki et al. ........................ 313/467
5,825,124  10/1998  Ohno et al. ........................... 313/467

OTHER PUBLICATIONS

Japanese Patent Abstract corresponding to Japanese Application No. 56-17744, ABS GRP No: E142; ABS vol NO: vol. 6, No. 230, Aug. 17, 1982.
Derwent Abstract (JP 55001003 A); ACC–NO: 1980–11777C; Derwent Week 198007, Jan. 7, 1980.

*Primary Examiner*—Ashok Patel
*Attorney, Agent, or Firm*—Rader, Fishman & Grauer; Ronald P. Kananen

[57] ABSTRACT

In a cathode-ray tube, a phosphor screen is formed by employing a blue phosphor obtained by mixing Cu with ZnS:Ag, Al in a normal solid phase reaction, then forming the phosphor solution on the inner surface of a panel of a cathode ray tube. The resulting cathode-ray tube can have increased brightness with negligible loss of chromacity. The amount of Cu as a co-activator in the blue phosphor can range between 0.6 to 1.5 ppm. In a preferred embodiment, the blue phosphor has a chromacity y-value of 0.089.

10 Claims, 6 Drawing Sheets

CATHODE-RAY TUBE AND BLUE PHOSPHOR

BACKGROUND

1. Field of the Invention

The present invention relates to a cathode-ray tube applied to a three-tube type projector and so on and a blue phosphor for use in a phosphor surface thereof.

2. Background of the Invention

There has been known a three-tube type video projector in which single-color cathode-ray tubes for red (R), green (G) and blue (B) are arranged in line and projection lenses provided in front of the respective single-color cathode-ray tubes enlarge and form an image on a screen.

It is urgently required to improve brightness of blue color in such video projector.

ZnS:Ag, Al has been used as a blue phosphor for the projector. Various attempt described later on have been made in order to improve brightness in a single-color cathode-ray tube for blue color.

(i) Method of Improving Efficiency of Extracting Light

In this method, an interference film in which oxidized films of aluminum and titanium or of tantalum and silicon are alternately laminated in a multilayer structure is deposited between a panel inner surface of a cathode-ray tube and a phosphor surface thereof, and this interference film gives directivity to light emitted from a phosphor film by excitation. Thus, the efficiency of extracting light is improved, thereby brightness being increased.

(ii) Method of Increasing Density of Phosphor Film

In this method, density of a phosphor film is increased by making particles of phosphor smaller and increasing a package density of phosphor. Thus, a so-called browning phenomenon caused when electron beams passes through a phosphor film and then collides with a panel glass is prevented, and a current density is increased to that extent, thereby the brightness being improved.

(iii) Method of Optimizing Thickness of Phosphor Film

In this method, a thickness of the phosphor film is optimized, thereby the brightness being improved.

(iv) Method of Preventing Panel Glass from Browning

In this method, alumina sol is deposited on a panel inner surface, thereby the panel glass being prevented from browning. The current density is increased to that extent, thereby the brightness being improved.

However, the method (i) employing the interference film encounters a problem of dependency upon an angle of view and also encounters disadvantages such as change of transmission characteristics presented when deterioration of the interference film (so-called increase of film density) is caused by irradiation of electron beams, occurrence of the browning phenomenon, and the like.

The method (ii) of increasing the density of the phosphor film encounters the disadvantage that the brightness of the phosphor itself becomes unsatisfactory by making particles of the phosphor smaller and the brightness cannot be improved to an expected degree.

The method (iii) of optimizing the thickness of the phosphor film encounters the disadvantage that it is difficult to optimize the thickness thereof when the phosphor film is actually manufactured.

The method of (iv) of preventing the panel glass from browning encounters the disadvantages that in the thermal process the alumina sol film is easily cracked and the phosphor film easily becomes uneven.

SUMMARY OF THE INVENTION

In view of such aspects, it is an object of the present invention to provide a cathode-ray tube which can improve brightness of blue and a blue phosphor used in a phosphor screen thereof.

According to the present invention, a phosphor obtained by employing Cu as a co-activator in ZnS:Ag, Al is used as a blue phosphor.

The blue phosphor obtained by employing Cu as a co-activator in ZnS:Ag, Al presents a higher brightness in view of visual sensitivity as compared with a conventional blue phosphor formed of ZnS:Ag, Al.

If the blue phosphor obtained by employing Cu as a co-activator in ZnS:Ag, Al is used to form a phosphor screen of a cathode-ray tube, then the brightness of blue color can be increased.

DETAILED DESCRIPTION OF THE PREFERRED EMBODIMENT

A cathode-ray tube according to the present invention has a phosphor surface employing a blue phosphor obtained by employing Cu as a co-activator in ZnS:Ag, Al.

In the cathode-ray tube according to the present invention, an amount of Cu as a co-activator in a blue phosphor is set within the range from 0.6 to 1.5 ppm.

A blue phosphor according to the present invention is obtained by mixing Cu as a co-activator with ZnS:Ag, Al.

In the blue phosphor according to the present invention, an amount of Cu as a co-activator is set within the range from 0.6 to 1.5 ppm.

The present invention will hereinafter be described with reference to the accompanying drawings and tables.

A blue phosphor according to the present invention is a phosphor obtained by mixing Cu as a co-activator in ZnS:Ag, Al (hereinafter referred to as a blue phosphor made of ZnS:Ag, Al, Cu). This blue phosphor made of ZnS:Ag, Al, Cu can be manufactured by normal solid phase reaction.

Table 1 shows relationship among chromaticity, relative brightness and an amount of Cu as a co-activator in the blue phosphor made of ZnS:Ag, Al, Cu according to the present invention.

TABLE 1

| chromacity | | relative | amount of Cu as co- |
|---|---|---|---|
| x | y | brightness (%) | activator (ppm) |
| 0.145 | 0.069 | 100.0 | 0 |
| 0.146 | 0.074 | 105.9 | 0.6 |
| 0.147 | 0.080 | 109.2 | 0.9 |

TABLE 1-continued

| chromacity | | relative | amount of Cu as co- |
|---|---|---|---|
| x | y | brightness (%) | activator (ppm) |
| 0.148 | 0.084 | 117.5 | 1.2 |
| 0.149 | 0.089 | 127.2 | 1.5 |

A phosphor shown in Table 1 and having relative brightness of 100 is a conventional blue phosphor made of ZnS: Ag, Al. In the blue phosphors made of ZnS:Ag, Al, Cu according to the present invention, as a value y of chromacity, i.e., brightness in visual sensitivity is increased, the amount of Cu as a co-activator is increased. The amount of Cu as a co-activator is preferably set to 0.6 to 1.5 ppm and is most preferably set to 1.5 ppm. If the amount of Cu as a co-activator exceeds 1.5 ppm, then a color of blue displayed on a cathode-ray tube tends to be whitish and chromacity of the color of blue becomes out of chromacity of blue required by a specification of a cathode-ray tube.

In the blue phosphor according to the present invention, if the value y is 0.089, then relative brightness is improved by 27.2%.

As described later on, this characteristic can also be applied to an actual cathode-ray tube. When the blue phosphor according to the present invention is used, similarly to a conventional method, a slurry liquid can be blended and a phosphor screen of the cathode-ray tube can be manufactured.

Even if the value y is a value of 0.089 which is most effective in improvement of brightness, there is no problem of meeting the requirements of a cathode-ray tube.

Figure 1:
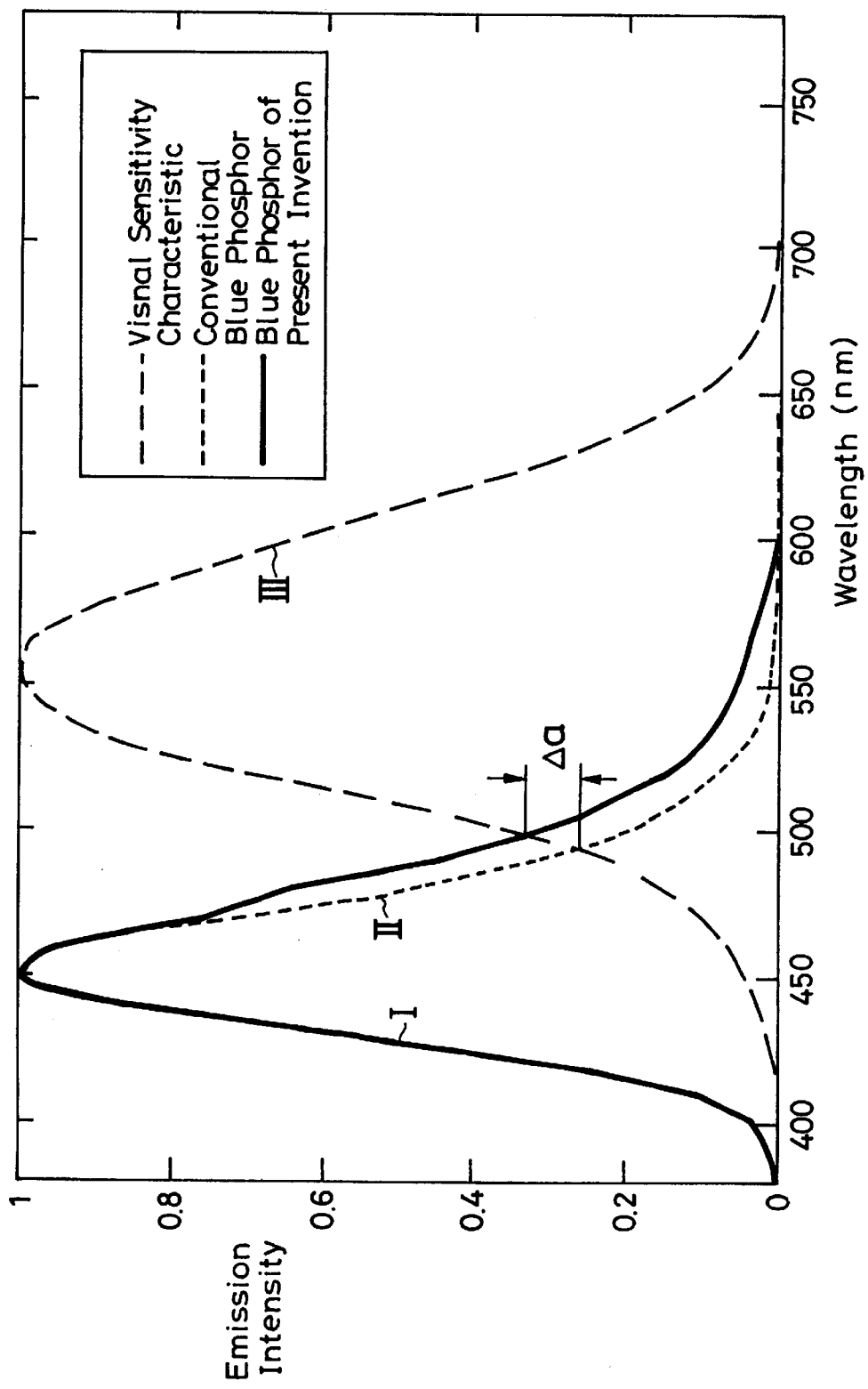
FIG. 1 is an explanatory graph showing emission spectrum of a blue phosphor according to the present invention, emission spectrum of a conventional blue phosphor, and characteristics of visual sensitivity.

FIG. 1 is a graph showing emission spectrum (curve I) of the blue phosphor made of ZnS:Ag, Al, Cu according to the present invention, emission spectrum (curve II) a conventional blue phosphor made of ZnS:Ag, Al, and characteristic of visual sensitivity (curve III).

Study of FIG. 1 allows confirmation of the fact that brightness in visual sensitivity of the blue phosphor according to the present invention is increased by Δa as compared with the conventional blue phosphor.

Simulation results used for proving characteristics of the blue phosphor made of ZnS:Ag, Al, Cu according to the present invention will be described. It was checked by simulation how relative brightness and chromacity are varied when emission spectrum is varied.

Figure 2:
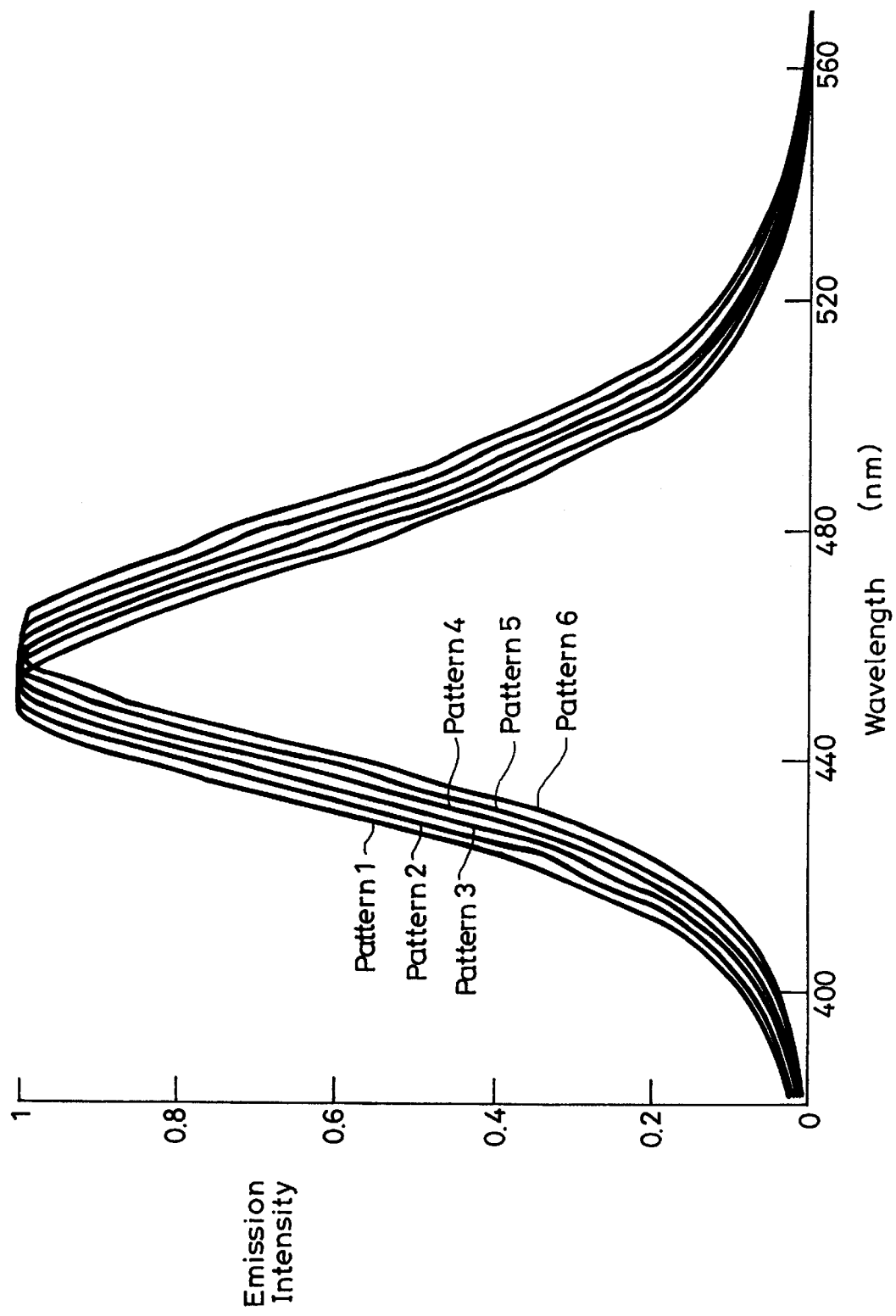
FIG. 2 is a graph showing emission spectra and used to explain the present invention.

FIG. 2 is a graph showing emission spectra of patterns 2 to 6 obtained when emission spectrum of a pattern 1 having relative brightness of 100 (a peak wavelength of 450 nm) is shifted toward a long wavelength side by 2 nm each. Table 2 shows simulation results of the emission spectra of patterns 1 to 6.

TABLE 2

| | relative | chromacity | |
|---|---|---|---|
| | brightness (%) | x | y |
| pattern 1 | 100.00 | 0.1444 | 0.0595 |
| pattern 2 | 107.91 | 0.1430 | 0.0643 |
| pattern 3 | 116.35 | 0.1415 | 0.0697 |
| pattern 4 | 125.39 | 0.1399 | 0.0756 |

TABLE 2-continued

| | relative | chromacity | |
|---|---|---|---|
| | brightness (%) | x | y |
| pattern 5 | 134.90 | 0.1383 | 0.0822 |
| pattern 6 | 145.06 | 0.1365 | 0.0896 |

Figure 3:
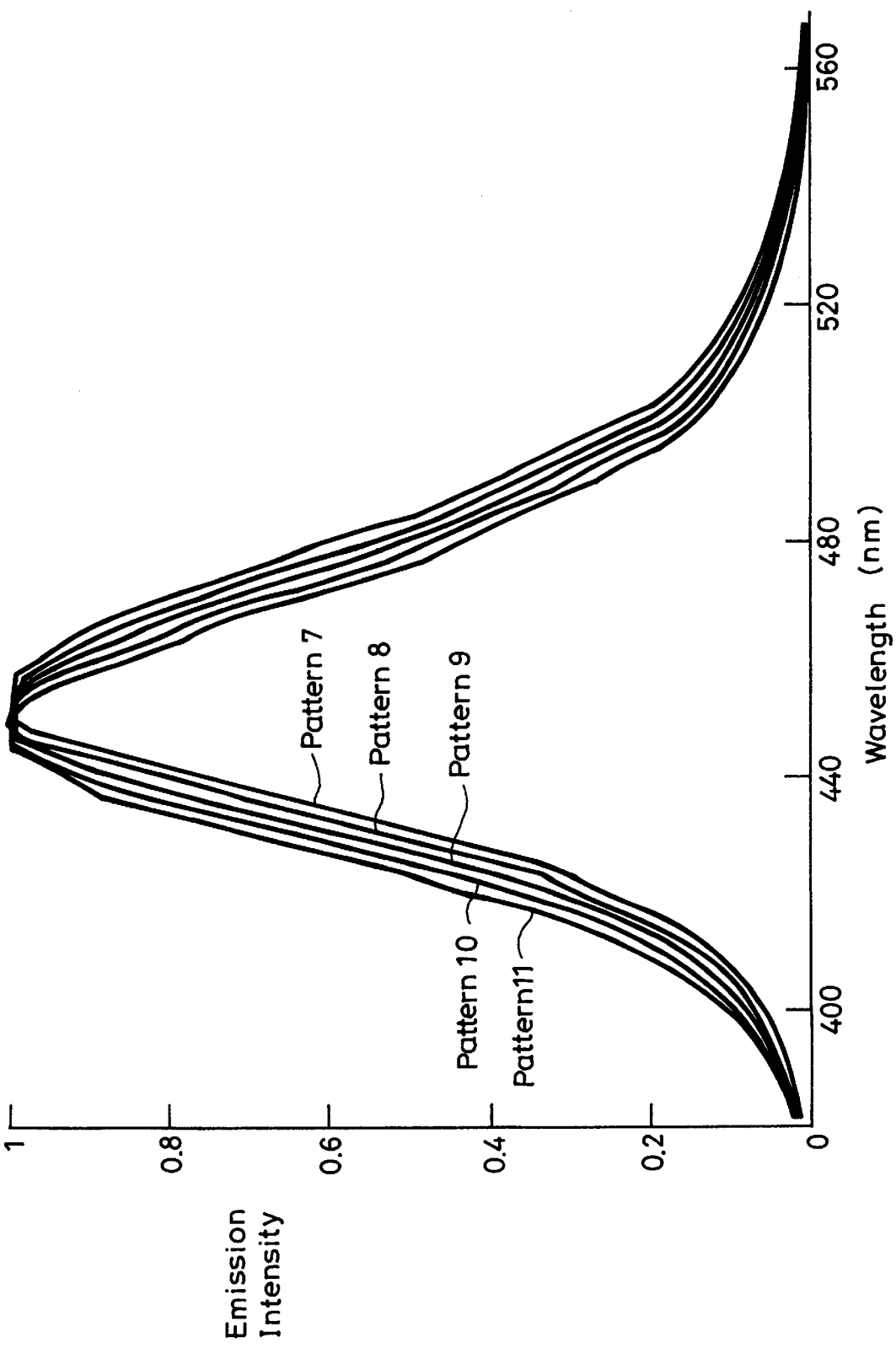
FIG. 3 is a graph showing emission spectra and used to explain the present invention.

FIG. 3 is a graph showing emission spectra of patterns 7 to 11 obtained when emission spectrum of a pattern 9 having relative brightness of 100 (a peak wavelength of 450 nm) is shifted toward a long wavelength side by a half bandwidth of 4 nm each. Table 3 shows simulation results of the emission spectra of patterns 7 to 11.

TABLE 3

| | relative | chromacity | |
|---|---|---|---|
| | brightness (%) | x | y |
| pattern 7 | 84.13 | 0.1448 | 0.0560 |
| pattern 8 | 91.77 | 0.1446 | 0.0577 |
| pattern 9 | 100.00 | 0.1444 | 0.0595 |
| pattern 10 | 108.61 | 0.1442 | 0.0616 |
| pattern 11 | 117.69 | 0.1439 | 0.0641 |

Study of FIG. 2 and Table 2 reveals that as the emission spectrum is shifted toward the long wavelength side, i.e., toward a region of higher visual sensitivity, relative brightness is increased and a value y of chromacity is increased. When the emission spectrum is shifted from that of the pattern 1 to that of the pattern 6 by 10 nm toward the long wavelength side, the brightness is increased by 45.6%. At this time, the value y of chromacity is shifted from 0.0595 to 0.0896.

Study of FIG. 3 and Table 3 reveals that even if the half bandwidth of the emission spectrum is varied, both of the brightness and the chromacity are varied. In FIG. 3 and Table 3, the emission spectrum of the pattern 9 is the same as that of the pattern 1. FIG. 3 and Table 3 show results obtained when the half bandwidth of the emission spectrum of the pattern 9 is shifted by ±4 and 8 nm. If the half bandwidth is set smaller, the chromacity becomes deeper but relative brightness is lowered. Conversely, if the half bandwidth is set larger, then the chromacity becomes slightly light and the brightness is increased. When the emission spectrum is shifted toward the long wavelength side, i.e., toward the region of higher visual sensitivity characteristic as compared with the short wavelength side, the shift largely contribute to the relative brightness and hence the relative brightness is improved.

Figure 4:
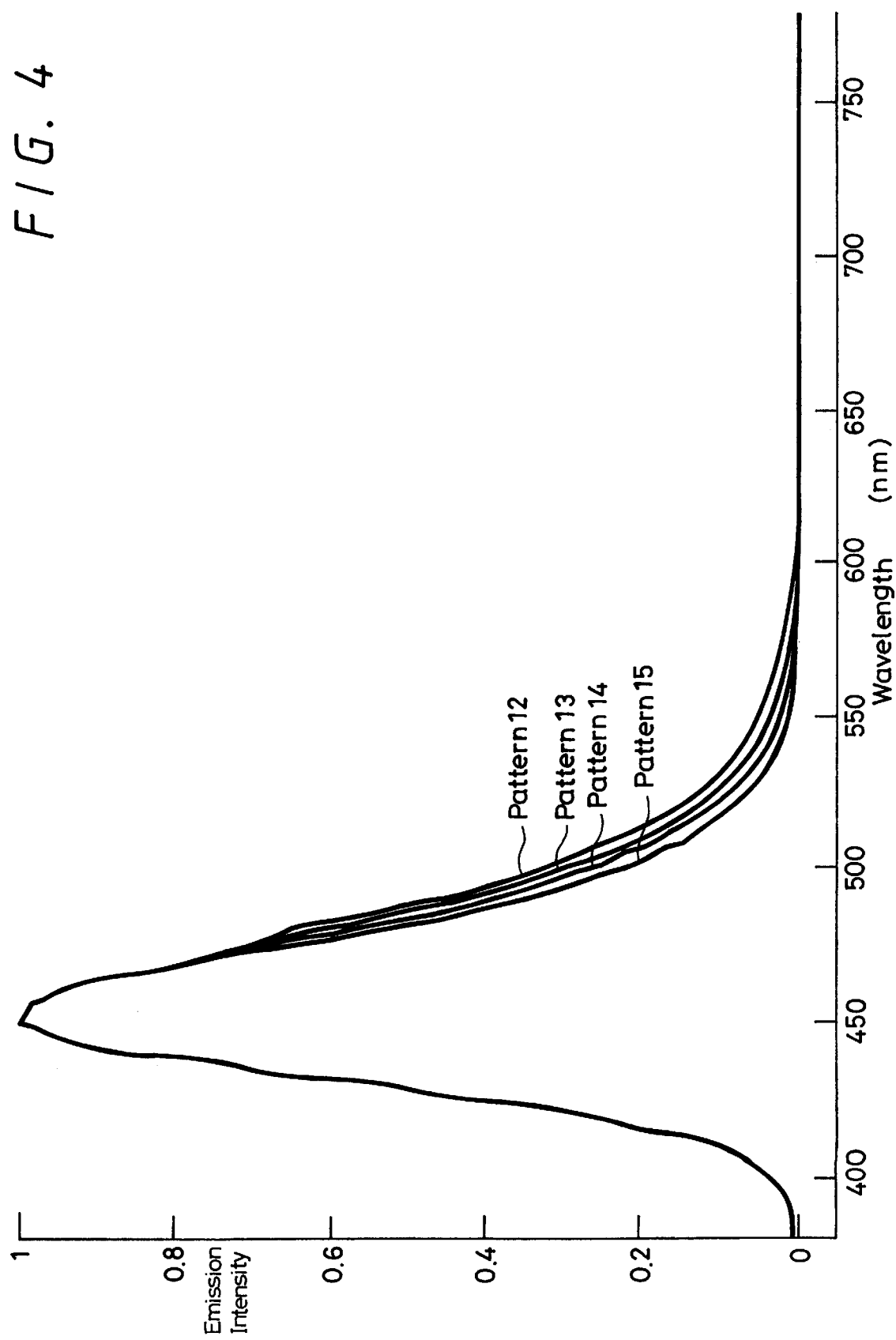
FIG. 4 is a graph showing emission spectra and used to explain the present invention.

FIG. 4 and Table 4 shows simulation results obtained when only long wavelength side of the emission spectrum of the blue phosphor obtained by mixing Cu as a co-activator in ZnS:Ag, Al is shifted toward the long wavelength side of the graph.

TABLE 4

| | relative | chromacity | |
|---|---|---|---|
| | brightness (%) | x | y |
| pattern 12 | 159.33 | 0.1463 | 0.0964 |
| pattern 13 | 138.9 | 0.1451 | 0.0862 |

TABLE 4-continued

|  | relative brightness (%) | chromacity | |
| --- | --- | --- | --- |
|  |  | x | y |
| pattern 14 | 118.6 | 0.1438 | 0.0755 |
| pattern 15 | 100.0 | 0.1456 | 0.0650 |

FIG. 4 and Table 4 reveals that as the wavelength of the emission spectrum is set longer, the relative brightness is increased and the value y of the chromacity is increased.

Study of the above simulation results reveals that relative brightness and chromacity of the blue phosphor according to the present invention become similar to those of the simulation results.

Figure 5:
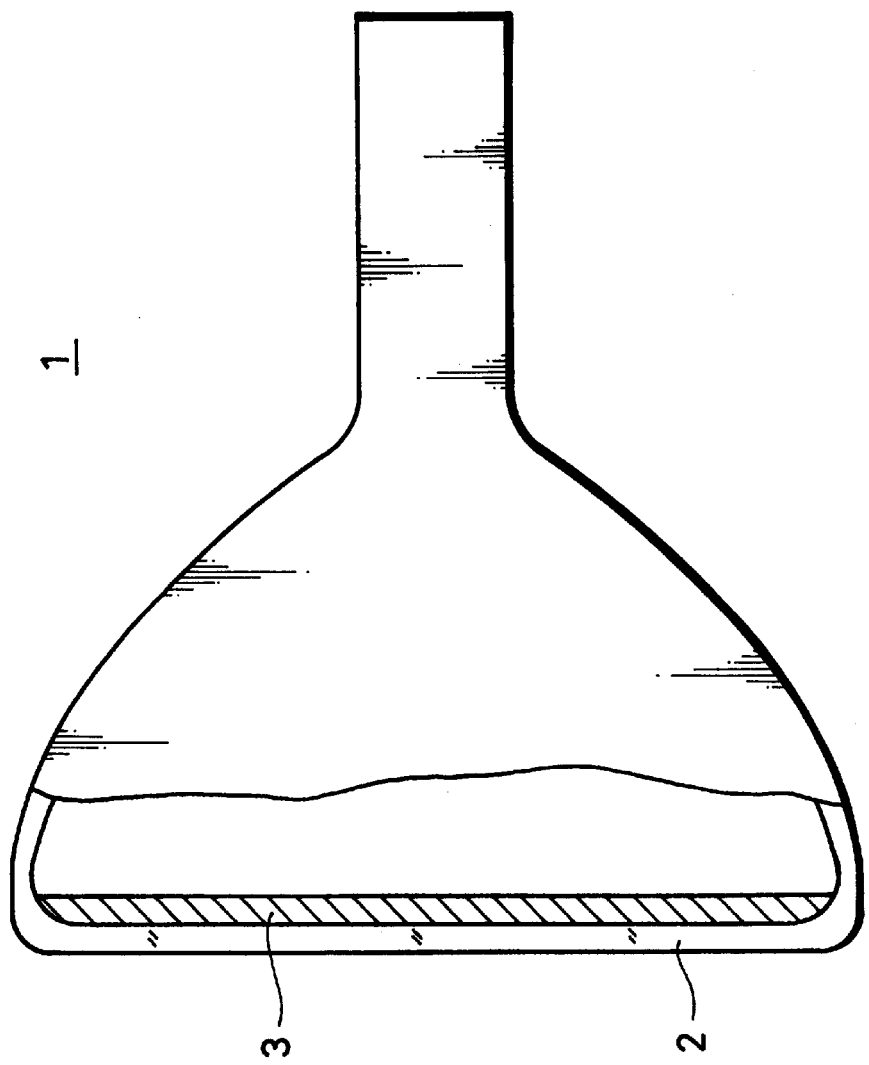
FIG. 5 is a diagram showing an arrangement of a cathode-ray tube according to the present invention.

As shown in FIG. 5, according to the present invention, a phosphor screen 3 formed by employing the above blue phosphor made of ZnS:Ag, Al, Cu is formed on an inner surface of a panel 2 of a cathode-ray tube. Thus, a blue single-color cathode-ray tube 1 for a projector is arranged.

Figure 6:
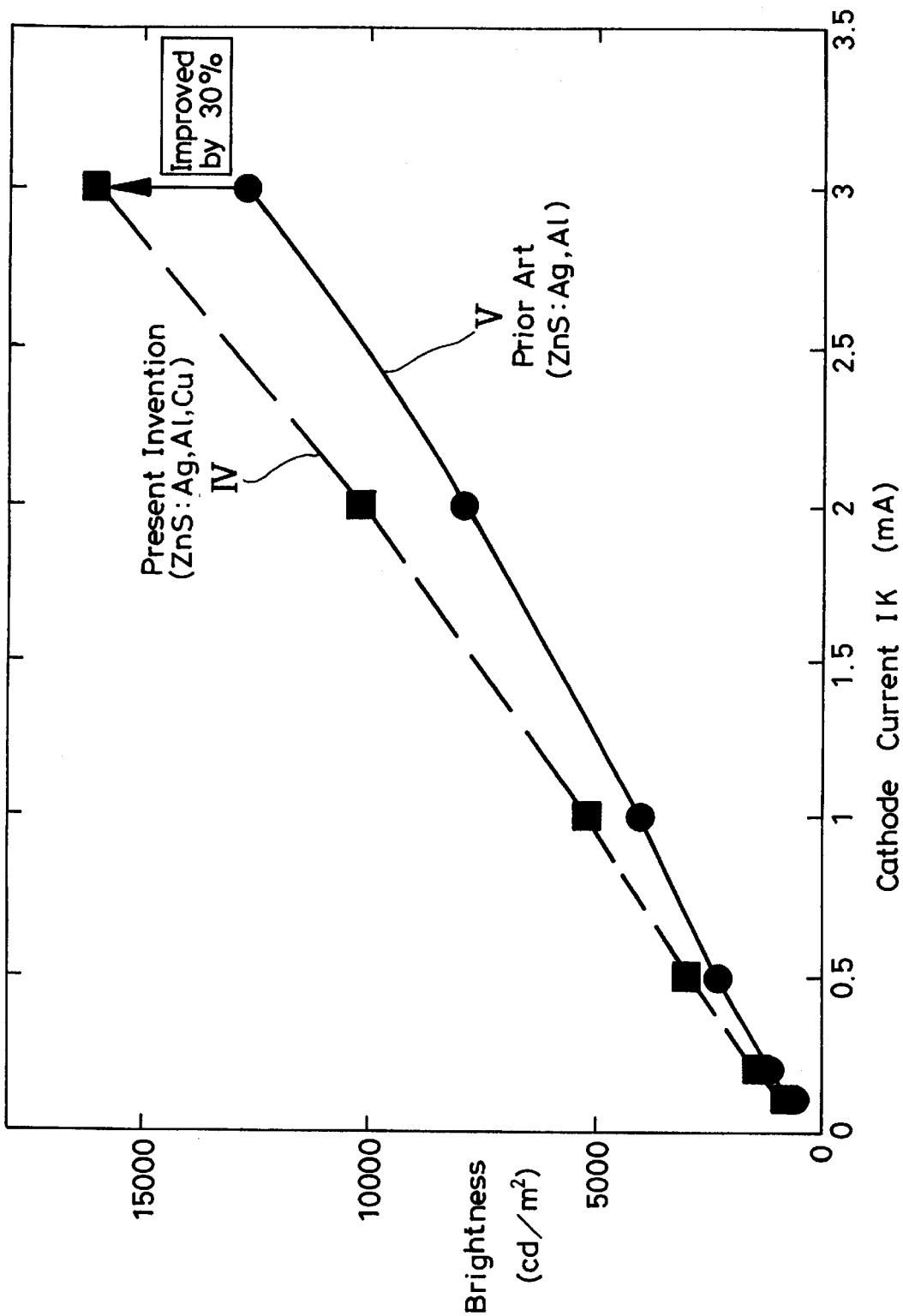
FIG. 6 is a graph showing brightness characteristics of the cathode-ray tubes of the present invention and the prior art for comparison.

FIG. 6 is a graph showing brightness characteristics of the blue single-color cathode-ray tube 1 (curve IV) according to the present invention and a conventional blue single-color cathode-ray tube (curve V) for comparison.

The blue phosphor employed in the present invention is a phosphor made of ZnS:Ag, Al, Cu and having Cu as the co-activator whose amount is 1.5 ppm. A blue phosphor employed in the prior art is a phosphor made of ZnS:Ag, Al.

Study of FIG. 6 reveals that brightness of blue of the cathode-ray tube 1 (curve IV) according to the present invention is improved by 30% as compared with that of the conventional cathode-ray tube (curve V).

As described above, in the projector cathode-ray tube according to the present invention, the phosphor which is obtained by mixing Cu as the co-activator in ZnS:Ag, Al and which has higher brightness in visual sensitivity is employed. Therefore, it is possible to increase the brightness of blue.

The present invention is limited to a general color cathode-ray tube as well as the projector tube.

According to the cathode-ray tube of the present invention, the phosphor which is obtained by mixing Cu as the co-activator in ZnS:Ag, Al and which has higher brightness in visual sensitivity is employed as the blue phosphor used in the phosphor screen thereof. Therefore, it is possible to increase the brightness of blue.

If the amount of Cu as the co-activator is set to 0.6 to 1.5 ppm, then it is possible to increase the brightness of blue of the cathode-ray tube without departing from the chromacity of blue required by the specification of the cathode-ray tube.

According to the blue phosphor of the present invention, since the phosphor is made by mixing Cu as the co-activator in ZnS:Ag, Al, it is possible to obtain the blue phosphor having high brightness in visual sensitivity.

If the amount of Cu as the co-activator is set to 0.6 to 1.5 ppm, then it is possible to increase the brightness in visual sensitivity of the blue phosphor without departing from the chromacity of blue required by the specification of the cathode-ray tube.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A cathode-ray tube, comprising:

a phosphor screen employing a blue phosphor, said blue phosphor obtained by employing Cu as a co-activator in a solution of ZnS:Ag, Al, whereby said solution is formed on the inner surface of a panel of the cathode-ray tube.

2. A cathode-ray tube according to claim 1, wherein an amount of Cu as a co-activator is set to range between 0.6 to 1.5 ppm.

3. A blue phosphor, comprising:

a blue phosphor solution of ZnS:Ag, Al, said solution having Cu as a co-activator, said solution being formed on the inner surface of a panel of a display, whereby brightness of blue color is improved when said display is activated.

4. A blue phosphor according to claim 3, wherein an amount of Cu as a co-activator in said blue phosphor solution is set to range between 0.6 to 1.5 ppm.

5. A blue phosphor according to claim 3, wherein said blue phosphor has a chromacity y-value of 0.089.

6. A blue phosphor according to claim 3, wherein said mixing step is performed by normal solid phase reaction.

7. A method for improving blue phosphors, comprising:

mixing Cu as a co-activator into a blue phosphor solution of ZnS:Ag, Al; and forming said blue phosphor solution on the inner surface of a panel of a display, whereby brightness of blue color is improved when the cathode ray tube is activated.

8. A blue phosphor method according to claim 7, wherein an amount of Cu as a co-activator in said blue phosphor solution is set to range between 0.6 to 1.5 ppm.

9. A blue phosphor method according to claim 7, wherein said blue phosphor has a chromacity y-value of 0.089.

10. A blue phosphor method according to claim 7, wherein said mixing step is performed by normal solid phase reaction.

* * * * *